Patented Aug. 11, 1942

2,292,998

UNITED STATES PATENT OFFICE 2,292,998

NITROGEN SUBSTITUTED SULPHIMIDES

Winfrid Hentrich, Rodleben, near Dessau-Rosslau, Anhalt, and Erik Schirm, Dessau, Anhalt, Germany, assignors, by mesne assignments, to "Unichem" Chemikalien Handels A.-G., Zurich, Switzerland, a corporation of Switzerland No Drawing. Application June 30, 1939, Serial No. 282,202. In Germany June 30, 1938

12 Claims. (Cl. 260—556)

This invention relates to nitrogen substituted sulphimides, and more particularly to their preparation from salts of sulphimides.

In accordance with this invention, salts of sulphimides of the general formula

in which R and R' are organic substituents which may contain additional —$SO_2NH$—X-groups and/or hetero atoms or hetero atomic groups composed of or containing such atoms as halogen, oxygen, sulfur, nitrogen and the like and in which X is a $SO_2$ or CO radical, are reacted with hydrocarbons containing radicals which react with the cation of said salt and wherein a hydrocarbon is substituted into the sulphimide.

The instant process which produces the nitrogen substituted sulphimides from the salts of the sulphimides especially alkali and alkaline earth salts constitutes a novel and unexpected procedure for the reason that double decomposition reactions involving salts of acids and halogen organic compounds, take place in the smaller extent, the stronger the acids are. The sulphimides of the present invention are strong acids, being at least as strong as the strongest carboxylic acids.

The reaction is accomplished by heating salts of the sulphimides, preferably dissolved or suspended in an inert solvent such as toluol, benzol, xylol, chlorbenzene, benzine, lower fatty alcohols, chlorhydrocarbons and the like, with hydrocarbons containing groups which react with the cations of the salts of the sulphimides. The reaction may be carried out at atmospheric pressure or may be carried out at superatmospheric pressure. The pressure selected depends upon the nature of the raw materials and the solvents to be used. The reaction may be accelerated and the reactive conditions made less severe by adding a catalyst. For instance, small quantities of alkali iodides accelerate reactions using chlorcompounds and brom-compounds permitting the reaction to take place at lower temperatures.

In proceeding in accordance with a preferred embodiment of the invention alkali salts of the sulphimides are used. These salts may be readily prepared from the relatively strongly acid sulphimides. For instance, the sulphimides of the instant invention will react with an alkali carbonate giving off carbon dioxide and forming a neutral alkali salt. Sulphimides which react to form these salts and which conform to the formula include such compounds as: N-acetyl, N-isobutyryl, N-lauroyl benzene sulphamide; N-oleoyl toluene sulphamide; hexadecyl octyl disulphimide; octadecyl cyclohexyl disulphimide; tetradecyl benzyl disulphimide; di-p-toluene sulphimide; 3,4-dichlorbenzene benzyl sulphimide; 3-nitro benzene-4'-methyl benzene sulphimide; bis-(4',3'-dichlor sulpho benzene-1,3-disulpho benzene diimide) of the formula

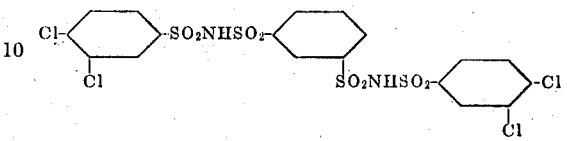

and the like. The hydrocarbon groups of the sulphimides may also contain hetero atoms such as halogen, oxygen, sulphur, nitrogen, or hetero atomic groups containing these atoms.

Substituted and unsubstituted hydrocarbons may be used as reagents to introduce hydrocarbon substituents onto the nitrogen atom provided they contain a group which will react with the salt forming radical of the sulphimide. When these hydrocarbon compounds contain such reactive radicals as halogens, oxygen containing esters of mineral acids and organic sulphonic acid esters, a reaction will occur wherein a neutral salt, such as an alkali metal salt, is separated out and the hydrocarbon group becomes attached to the nitrogen atom. Suitable compounds containing hydrocarbon groups and reactive radicals are: alkyl halogenides and alkyl groups interrupted by hetero atoms or hetero atomic groups, for instance, methylchloride, ethyl bromide, isobutyl iodide, beta-ethyl hexyl bromide, dodecyl chloride, oleyl chloride, betadiethyl amino ethyl chloride, beta-methoxy ethyl chloride, tetrahydrofurfuryl methyl chloride, phenyl thio ethyl chloride, beta, beta'-dichlor diethyl ether, beta-4-tolyl sulphonyl ethyl chloride, beta-phenoxy ethyl chloride; the sodium salt of tetradecyl sulphuric acid, p-toluene sulphonic acid -n-hexyl ester, the sodium salt of dodecyl-phosphoric acid, di-ethyl-sulphate, benzene sulphonic acid-beta-chlorethyl ester, betachlor-(or brom-) ethane sulphonic acid, 3-chlor-2-hydroxy propane sulphonic acid; ethylene chlorhydrine; the sodium salt of beta-chlorethyl sulphuric acid; monochlor acetic acid, alphabrom-lauric acid; esters and amides of the monohalogen fatty acids, for instance, monochlor acetic acid dodecylamide; benzyl chloride or its nuclear substitution products substituted by halogen, nitro or methoxy groups, alpha-menaphthyl chloride; benzyl chloride-4-sulphonic acid;

benzyl chloride-4-carboxylic acid; cyclohexyl bromide; 2- or 4-nitrochlorbenzene, 2,4-dinitro chlorbenzene, 3,4-dinitro chlorbenzene; iodine benzene; 4-nitro-chlorbenzene-2- sulphonic acid or 2-nitro chlorbenzene-4-sulphonic acid; 3-nitro-4-chlor diphenyl sulphone, 3-nitro-4- chlor diphenyl sulphone, 3-nitro-4- chlor diphenyl sulphone-3'-sulphonic acid, 5-nitro-2- chlorphenyl - methyl - sulphone; 1,3 - dichlor-4-nitro benzene-6-sulphonic acid; 1,3-dichlor-4,6- dinitro benzene; 5-nitro-2-chlor-benzyl-omega-sulphonic acid; 2-chlorbenzoic acid, 5-sulpho-2-chlor benzoic acid, 5-nitro-2-chlorbenzoic acid; brome benzene-2,4-disulphonic acid; 2-chlorbenzaldehyde, 5-nitro-2-chlorbenzaldehyde; 2,4-dinitro-chlorbenzene-6-sulphonic acid; 2,4-dinitro chlorbenzene-6-carboxylic acid; halogen anthraquinone or anthraquinone containing other exchangeable substituents, such as nitro, sulpho, alkoxy groups and the like; 4-methyl-2-chlorquinoline, and the like.

Since the process of the present invention is generally applicable to the various members of the classes of compounds herein set out, many commercially valuable products can be obtained by varying the raw materials used as reagents. Among these valuable commercial products are: textile assistants; disinfectants and insecticides, for instance, moth-proofing agents; tanning agents; anti-aging or preservative agents and softeners for lacquers and other synthetic materials, such as pharmaceuticals and the like.

The following examples, in which the parts are expressed in parts by weight, are illustrative of the inventive process.

*Example 1*

Three hundred and sixty-five parts of the sodium salt of di-p-toluene sulphimide are dissolved, while being heated, in 1200 parts of commercial tetrahydrofurfuryl alcohol. Then 10 parts of sodium iodide and 289 parts of octadecyl chloride are added at a temperature of approximately 80° C. The resulting mixture is boiled under a reflux condenser until the separation of sodium chloride is completed which usually requires about 5 to 6 hours. After the reaction is completed, the solvent is distilled off under decreased pressure. The residue is stirred with 2000 parts of water and 1000 parts of benzine having a boiling point of 80° to 90° C., the liquid preferably being filtered with a filtering agent such as fuller's earth or bleaching coal. The benzine solution is then distilled off from the aqueous salt solution. N-octadecyl di-p-toluene sulphimide having the formula

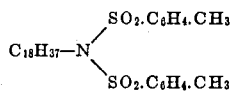

in the form of a yellowish wax-like mass remains as a residue. If this mass is dissolved in alcohol and the alcohol removed, an achromatic product is obtained with a melting point of 58° C.

*Example 2*

Four hundred and fifty-seven parts of the sodium salt of di-(3,4-dichlorbenzene)-sulphimide, 229 parts of the dry sodium salt of benzyl chloride-p-sulphonic acid and 4000 parts of alcohol are heated in an autoclave while being stirred for 6 hours at a temperature of 130° to 140° C. When the alcohol is distilled off and the residue recrystallized from water a condensation product having the following structural formula:

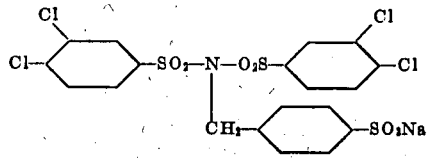

is obtained as a white crystalline powder.

*Example 3*

In operating in accordance with Example 2 the sodium salt of benzyl chloride-p-sulphonic acid is replaced with an equivalent quantity (211 parts) of the sodium salt of betabrom ethane sulphonic acid and the reaction mass is heated to a temperature of 160° to 170° C. After the reaction the alcohol is distilled off. The residue is then dissolved in water and the condensation product is separated therefrom by salting out. The condensation product has the following structural formula

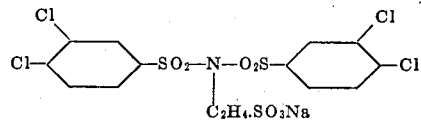

*Example 4*

Ninety parts of the sodium salt of the N-stearoyl benzene sulphamide are suspended in 700 parts of toluol, 47 parts of p-toluene sulphonic acid-beta-chlorethyl ester are added and the mixture is boiled and stirred under a reflux condenser until the reaction is completed. The reaction mass is then stirred with 700 parts of water at a temperature of 80° C. and allowed to settle. The layer of toluol is drawn off, and the residue is dried by distilling off the remaining toluol at a decreased pressure. A raw condensation product having the following formula:

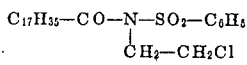

remains as a wax-like mass. This mass may be purified by redissolving it in alcohol.

*Example 5*

Three hundred and seventy parts of the potassium salt of n-dodecyl-methyl disulphimide, 202 parts of 2,4-dinitrochlor benzene and 3000 parts of butanol are boiled on a reflux condenser until the separation of the sodium chloride is complete. Thereafter the butanol is removed with water vapor. Upon cooling, a condensation product having the formula:

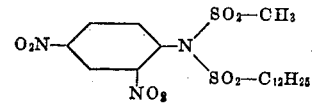

is filtered off and recrystallized from alcohol.

It should be understood that the present invention is not limited to the specific compositions, compounds, and processes herein set out, but that its scope is to be judged by the tenor of the specification and the wording of the claims.

We claim:

1. An N-hydrocarbon substituted diacyl imide containing an alkyl group of at least 8 carbon atoms, wherein the acyl radicals are selected from the group consisting of carbonyl and sulphonyl radicals, at least one of the acyl radicals being a sulphonyl radical.

2. An N-hydrocarbon substituted diacyl imide containing an alkyl group of at least 8 carbon atoms, wherein one acyl radical is a sulphonyl radical and the other acyl radical is a carbonyl radical.

3. An N-hydrocarbon substituted disulphonyl imide containing an alkyl radical of at least 8 carbon atoms.

4. An N-hydrocarbon substituted diacyl imide containing an alkyl group of at least 8 carbon atoms directly attached on the N atom, wherein the acyl radicals are selected from the group consisting of carbonyl and sulphonyl radicals, at least one of the acyl radicals being a sulphonyl radical.

5. An N-hydrocarbon substituted diacyl imide containing an alkyl group of at least 8 carbon atoms wherein the acyl radicals are selected from the group consisting of carbonyl and sulphonyl radicals at least one of which contains an alkyl group of at least 8 carbon atoms, and at least one of the acyl radicals being a sulphonyl radical.

6. An N-hydrocarbon substituted diacyl imide having the formula:

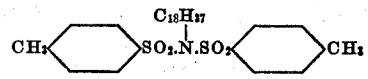

7. An N-hydrocarbon substituted diacyl imide having the formula:

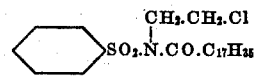

8. An N-hydrocarbon substituted diacyl imide having the formula:

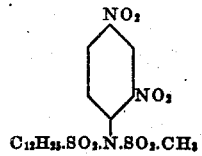

9. A process for preparing an N-hydrocarbon substituted diacyl imide containing an alkyl group of at least 8 carbon atoms comprising reacting a salt of a diacyl imide, wherein the acyl radicals are selected from the group consisting of carbonyl and sulphonyl radicals at least one of the acyl radicals being a sulphonyl radical, with a hydrocarbon having attached to a carbon atom thereof an inorganic anion component reactive with the cation forming said salt, at least one of the reactants containing an alkyl group of at least 8 carbon atoms.

10. A process for preparing an N-hydrocarbon substituted diacyl imide containing an alkyl group of at least 8 carbon atoms comprising reacting a salt of a diacyl imide, wherein one acyl radical is a sulphonyl radical and the other acyl radical is a carbonyl radical, with a hydrocarbon having attached to a carbon atom thereof an inorganic anion component reactive with the cation forming said salt, at least one of the reactants containing an alkyl group of at least 8 carbon atoms.

11. A process for preparing an N-hydrocarbon substituted diacyl imide containing an alkyl group of at least 8 carbon atoms comprising reacting an alkali metal salt of a diacyl imide, wherein the acyl radicals are selected from the group consisting of carbonyl and sulphonyl radicals at least one of the acyl radicals being a sulphonyl radical, with an alkyl halide, at least one of the reactants containing an alkyl group of at least 8 carbon atoms.

12. A process for preparing an N-hydrocarbon substituted diacyl imide containing an alkyl group of at least 8 carbon atoms comprising reacting a salt of a diacyl imide, wherein the acyl radicals are selected from the group consisting of carbonyl and sulphonyl radicals at least one of the acyl radicals being a sulphonyl radical, with a hydrocarbon having attached to a carbon atom thereof a sulphonic acid ester radical reactive with the cation forming said salt, at least one of the reactants containing an alkyl group of at least 8 carbon atoms.

WINFRID HENTRICH.
ERIK SCHIRM.